Nov. 26, 1935.  A. G. THOMAS  2,022,578
QUICK READING VISCOSIMETER
Filed April 7, 1933     4 Sheets-Sheet 1
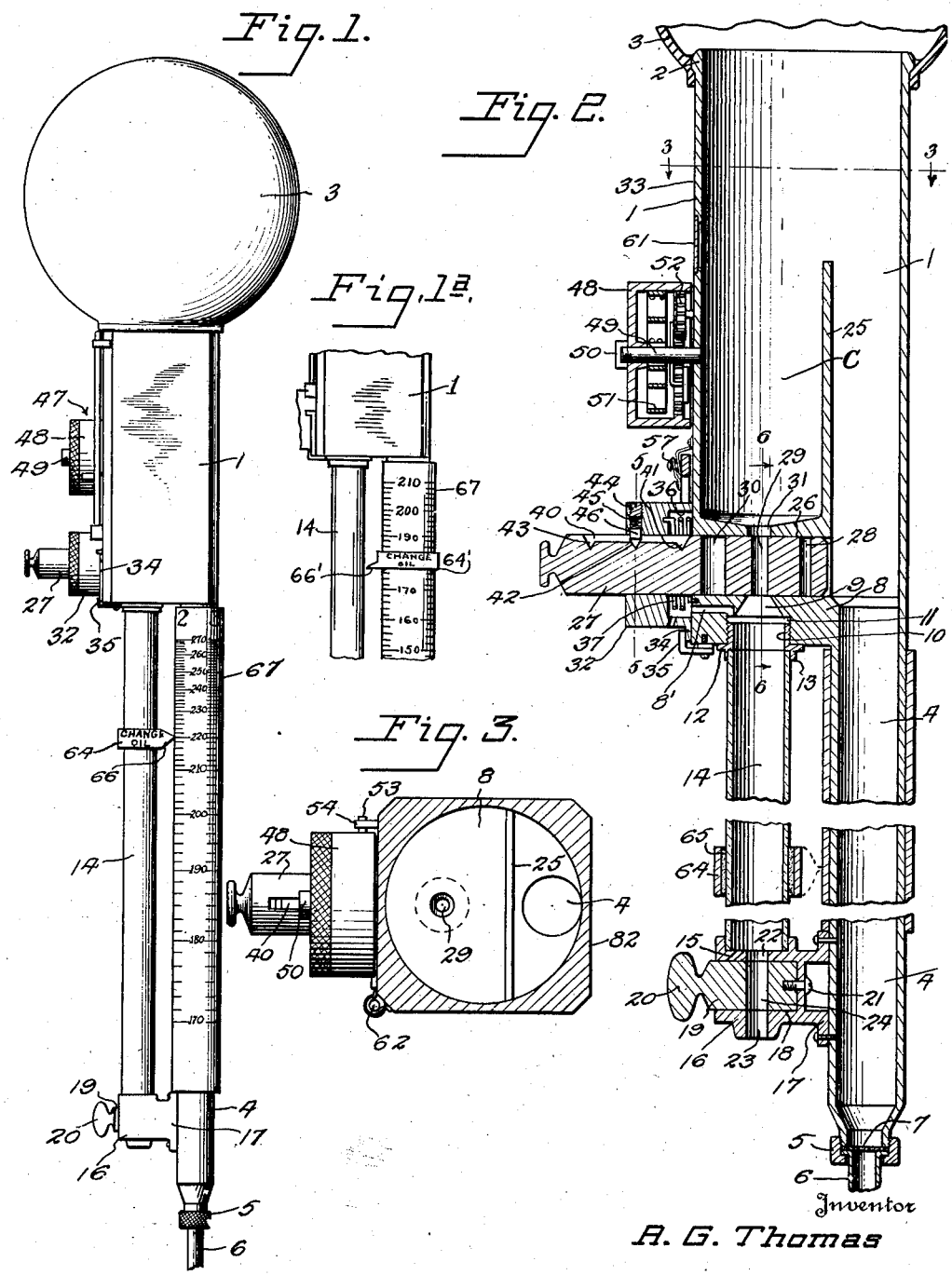
Inventor
A. G. Thomas
By Mason Fenwick & Lawrence
Attorneys Nov. 26, 1935.  A. G. THOMAS  2,022,578
QUICK READING VISCOSIMETER
Filed April 7, 1933  4 Sheets-Sheet 2
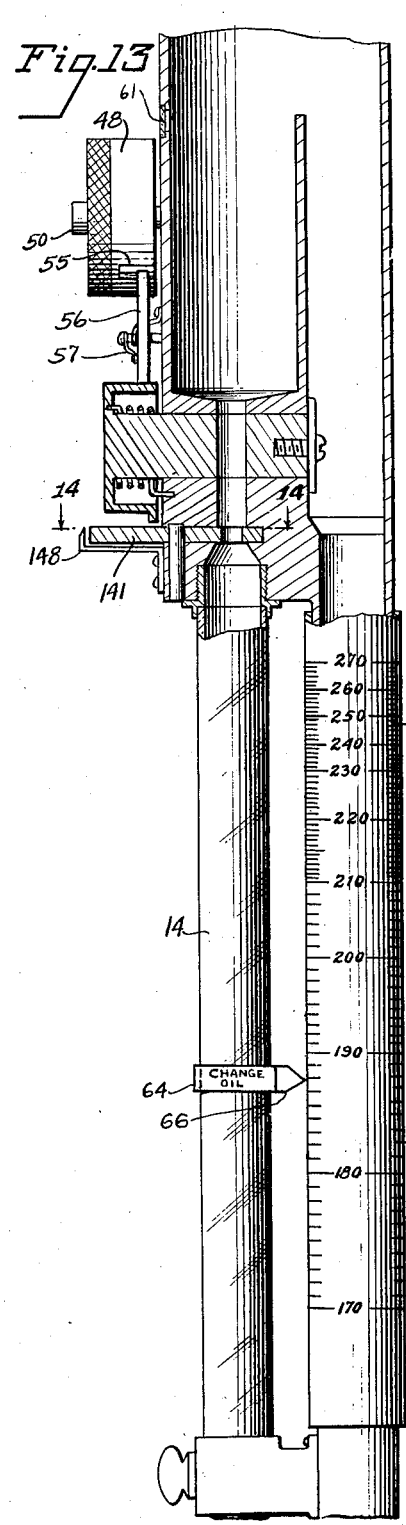
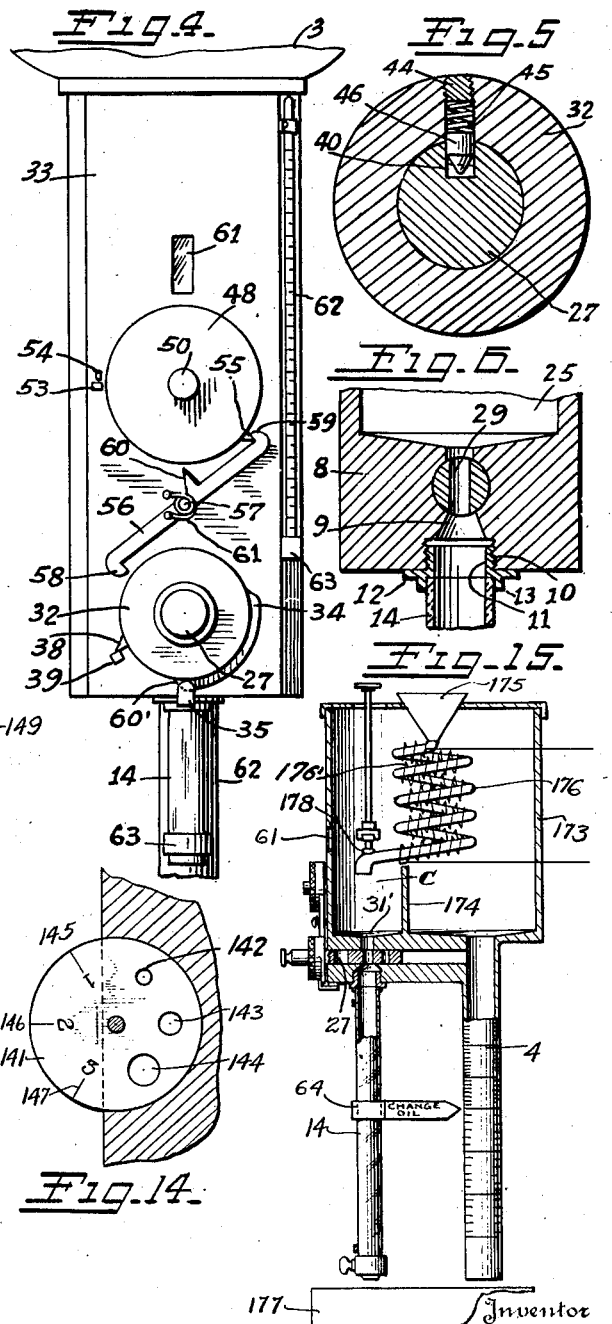
Inventor
A. G. Thomas
By Mason Fenwick Lawrence
Attorneys

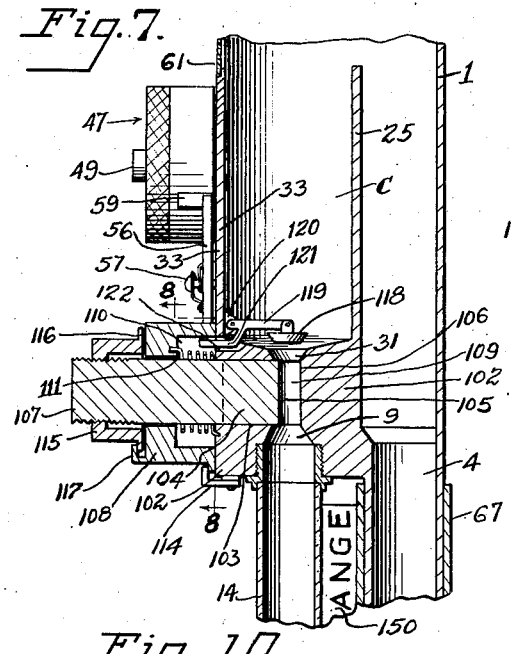
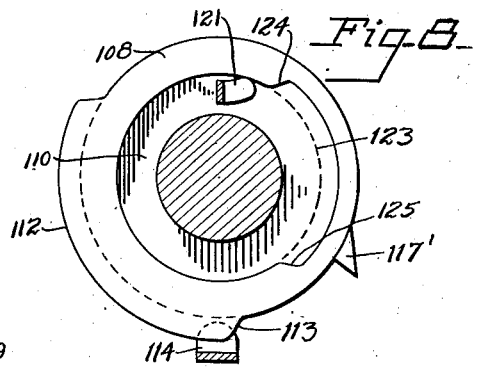
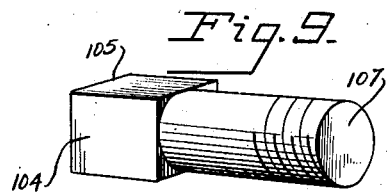
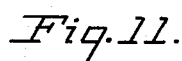
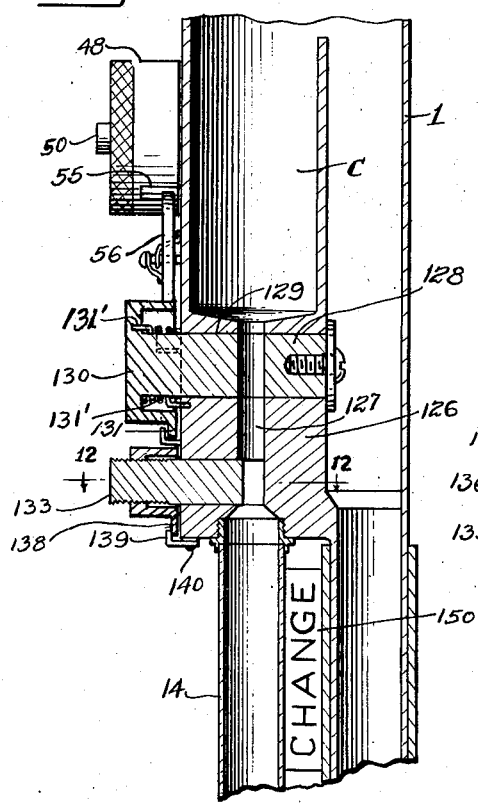
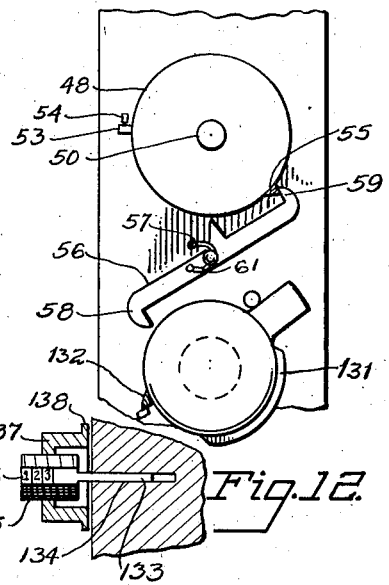

Nov. 26, 1935.    A. G. THOMAS    2,022,578
QUICK READING VISCOSIMETER
Filed April 7, 1933    4 Sheets-Sheet 4

Inventor
A. G. Thomas
By Mason Fenwick & Lawrence
Attorneys

Patented Nov. 26, 1935

2,022,578

UNITED STATES PATENT OFFICE 2,022,578

QUICK READING VISCOSIMETER

Albert G. Thomas, Lynchburg, Va.

Application April 7, 1933, Serial No. 664,974

11 Claims. (Cl. 265—11)

This application is a continuation-in-part of my application, Serial No. 620,659, filed July 2, 1932, for improvements in viscosimeters, which matured into Patent No. 1,960,465, May 29, 1934.

The present invention relates to the subject matter of the said application, designed to determine the viscosity of lubricating oils commonly used in automobiles.

Viscosity of any oil is a good indicator of its lubricating qualities. After oil has been used in an engine for some time the film breaks down by heat, and the oil becomes diluted so that, eventually, it becomes unsuited for lubrication purposes. Heretofore, the determination of the condition of lubricating oils by operators of filling stations has been made by the operators examining samples of used oil from the engine crank case and feeling or looking at the same in order to make some kind of rough guess as to its condition. There is nothing in common use by these operators designed to furnish a scientific test as to the condition of the used oil in an automobile crank case to determine whether or not a change of oil is necessary, and it has been impracticable for the operators to make scientifically accurate tests of viscosity on account of the length of time previously required to make such tests.

The main object of the present invention is, therefore, to provide a quick reading viscosimeter by means of which a filling station attendant can quickly test the quality of a sample of oil extracted from the crank case of an automobile, and which will show accurately and graphically its lubricating qualities.

Opacity is another test sometimes used for testing the lubricating qualities of motor oil, by determining the amount of foreign matter suspended in the oil. In the present invention, opacity and viscosity of the oil can be tested in the same device and indicated very rapidly. Accordingly, it is another object of this invention to provide a device in which these tests can be carried out to supplement each other.

Other objects of the invention will become apparent as the detailed description thereof proceeds.

In the drawings:

Figure 1 is a side elevation of a viscosimeter embodying the present invention;

Figure 1a is a fragmentary side elevation of the temperature and depth indicating elements of Figure 1 illustrating a modification thereof;

Figure 2 is a broken vertical transverse section, to an enlarged scale, of the invention illustrated in Figure 1;

Figure 3 is a horizontal section taken on the line 3—3 of Figure 2;

Figure 4 is a fragmentary front elevation to an enlarged scale of the upper part of the viscosimeter shown in Figure 1;

Figure 5 is a vertical transverse section taken on the line 5—5 of Figure 2;

Figure 6 is a vertical transverse section taken on the line 6—6 of Figure 2;

Figure 7 is a fragmentary vertical section through a modification of the viscosimeter tester shown in Figures 1 and 2;

Figure 8 is a vertical section taken on the line 8—8 of Figure 7;

Figure 9 is a perspective view of one of the elements of the device shown in Figure 7;

Figure 10 is a fragmentary vertical transverse section through another modification of the device shown in Figures 1 and 2;

Figure 11 is a fragmentary front elevation of the upper part of the device shown in Figure 10;

Figure 12 is a horizontal section taken on the line 12—12 of Figure 10;

Figure 13 is a fragmentary sectional elevation through a further modification of the instrument illustrated in Figure 1;

Figure 14 is a horizontal section taken on the line 14—14 of Figure 13;

Figure 15 is a sectional side elevation through another form of the invention;

Figure 16:
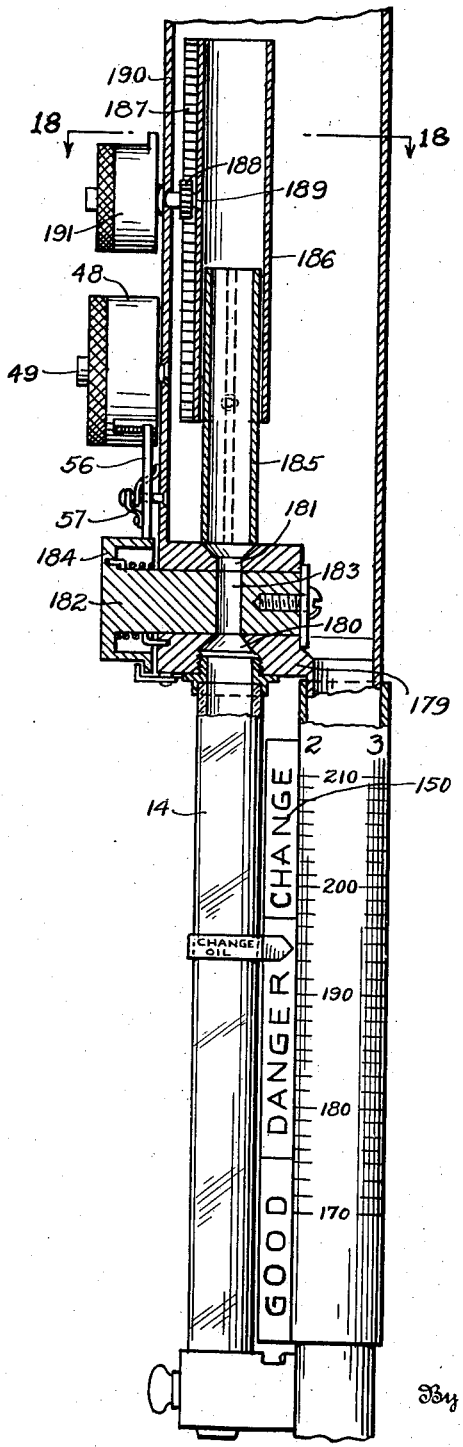
Figure 16 is a fragmentary central vertical section through another modification of the invention.

In the form of the invention shown in Figures 1 to 6, inclusive, a casing 1, preferably rectangular in external cross section, is provided at its upper end with a bead 2, adapted to receive and hold the lower end of an elastic bulb 3. The casing 1 is preferably shaped as a cylinder internally and, at its rear side, is extended downwardly to form a tube 4, the lower end of which is connected by a union 5 to a flexible pipe 6 adapted to be inserted into the crank case of an automobile to withdraw a sample of oil therefrom for the purpose of testing its viscosity and opacity. A screen 7 is secured between the lower end of the tube 4 and the upper flanged end of a pipe 6 by means of the union 5. A suction piston may be used instead of the rubber bulb.

The casing 1 adjacent the upper part of the tube 4 has a bottom 8 formed integrally therewith or suitably secured thereto. The bottom 8 is provided with an aperture 9 which, as shown in Figure 2, is shaped as the frustum of a cone having the wide end separated slightly from the upper edge of a fitting 10, screwthreaded externally to engage the internal screwthreads of a recess 11 formed in the bottom. The wide end of the aperture 9 is substantially of the same width as the diameter of the transparent test tube 14 extending coaxial therewith.

The fitting 10 is provided at its lower end with an outwardly turned flange 12 adapted to contact and form a stop with the lower face of the bottom 8; and a flange 13 extends downwardly from the flange 12 to form a seat for the upper end of the aforesaid transparent test tube 14. The lower end of the tube 14 is received in a socket 15 formed in a fitting 16 extending from a base 17 suitably secured to the adjacent flat wall of the tube 4. The fitting 16 is bored transversely of the axis of the tube 14 to form a cylindrical recess 18 in which is rotatably mounted a valve 19 adapted to be rotated by a handle 20 to control the flow of liquid from the tube 14. The valve 19 is secured rotatably in said recess 18 by a headed machine screw 21, the fitting and the valve being provided with apertures 22, 23 and 24 adapted to register with each other to drain the test tube 14 when desired.

A partition 25 extends upwardly from the bottom 8 into the casing 1, and the bottom 8 is bored to provide a cylindrical chamber 26 in which a shaft 27 is slidably and rotatably mounted. The shaft 27 is provided with three apertures 28, 29 and 30, of different diameters, extending with their axes parallel to each other diametrically through the shaft 27.

The bottom 8, at the part immediately above the shaft 27 is provided with an aperture 31 coaxial with the aperture 9. The aperture 31 and the upper narrow part of the aperture 9 are of the same diameter as that of the largest aperture 30 of the three apertures formed in the shaft 27. The distance of separation of the apertures 28, 29 and 30 is such that only one can register with the apertures 9 and 31 for any one position of the shaft 27.

A cylindrical knob 32 is bored to receive the shaft 27 slidably, and is secured to rotate with the shaft 27 on the flat front face 33 of the casing 1. A segmental flange 34 formed on the periphery of the knob 32 slides on the face 33 under the upturned arm 35 suitably secured to the bottom 8 of the casing 1. The knob 32 is provided with a cylindrical recess 36 in which a coil spring 37 is seated, one end of the coil spring being secured to the face 33 of the casing 1 while the other end is secured to the bottom wall of the recess 36. The coil spring 37 is wound to rotate the knob 32 anti-clockwise, as seen in Figure 4 of the drawings, until a lug 38 projecting from the arcuate periphery of the knob contacts with a stop 39 suitably secured to the face 33 of the casing 1.

The knob 32 is used to rotate the shaft 27, which is provided with a slot 40 extending parallel with its axis. The bottom of the slot 40 is provided with three small recesses 41, 42 and 43 corresponding in relative spacing to the relative spacing of the apertures 28, 29 and 30, respectively.

The knob 32 is bored radially to receive a screw-threaded plug 44 serving as a stop for one end of a compression spring 45 adapted to force the lower end of a pin 46 yieldingly against the bottom of the slot 40 and into any of the recesses 41, 42 and 43. This spring pressed pin construction is a well known form of yielding stop or "click" adapted to hold the shaft 27 frictionally in any one of its positions of axial adjustment with the corresponding apertures 28, 29 and 30 registering with the apertures 9 and 31.

A timing device 47 is rotatably mounted on the face 33 of the casing 1 directly above the knob 32. This timing device comprises a cylindrical cup 48 mounted to rotate on a pivot pin 49 which is suitably secured at one end to the front face 33 of the casing 1. A screw cap 50 threaded onto the end of the pin 49 serves to hold the cylindrical cup 48 rotatably against the front face 33. Within the cup 48 a coil spring 51 has one end secured to the pin 49, while the other end is secured to the inner periphery of the cup 48. Suitable gearing and escapement mechanism 52 is arranged on the face 33 of the casing 1 and connected to the cup 48 so that when the cup is turned clockwise through a definite angle and released, it will return through the same angle to its original position in a definite number of seconds. No attempt is made here to show or describe the details of this timing mechanism as the invention is not concerned with any particular form of such mechanism. Devices of this kind are old and very well known in all arts. A fly ball friction governor, such as is commonly used in talking machine motors, may be substituted for the escapement.

A stop lug 53 extends radially from the periphery of the cup 48 and is adapted, when the cup 48 is rotated clockwise, to strike against a stop 54 projecting outwardly from the face 33 of the casing 1. A wedge shaped lug 55 extends radially from the periphery of the cup 48 in a certain angular position relative to the lug 53. A bar 56 is mounted on the face 33 of the casing 1 to rotate about a pivot pin 57 having its axis substantially parallel to and in alignment with the axes of the shaft 27 and pin 49. The opposite ends of the bar 56 are provided with oppositely projecting lugs 58 and 59, and the center of the bar on the same side as the lug 59 is provided with an intermediate lug 60 for a purpose to be described hereafter.

A coil spring 61 having one end secured to the bar 56 is wound around the pivot pin 57, and has its other end suitably secured to the face 33 of the casing 1. This spring arrangement acts to rotate the bar 56 in anti-clockwise direction so as to urge the lug 59 against the periphery of the cup 48, and to urge the lug 58 against the periphery of the knob 32. The lugs 59 and 60 are so spaced on the bar 56 that when the cup 48 is rotated clockwise the wedge shaped lug 55, slightly in advance of the instant of contact between the stops 53 and 54, strikes against the rounded end of the lug 59 thereby rotating the bar 56 sufficiently in clockwise direction to raise the lug 58 from the periphery of the knob 32. As soon as the lug 53 strikes the stop 54, the bar 56 springs back into position so that the lug 59 engages the lug 55 to prevent rotation of the cup 48 back to original position. In this position, shown in Figure 4, the timer is set for operation when the knob 32 is operated to determine viscosity.

In the position of the timing mechanism shown in Figure 4 of the drawings, the timing cup 48 has been wound up with the stop 53 in contact with the stop 54 and with the cup held in wound position by cooperative engagement of the lug 59 with the lug 55. In the position shown in Figure 4, the knob 32 is held by the spring 37 with its lug 38 against the stop 39. In this position, the shaft 27 has been rotated by the knob 32 to move the apertures 28, 29 and 30 out of registry with the apertures 9 and 31.

In operation, assuming that the chamber formed by the partition 25 in the casing 1 has been filled with oil to be tested up to the top edge of said partition, the knob 32 is given a sharp turn clockwise until the edge 60' of the flange 34 strikes the stop 39. In thus rotating the knob 32, the inclined edge of the wedge shape lug 38 strikes the rounded edge of the stop lug 58 and rotates the bar 56 clockwise so as to release the lug 55 from the lug 59 on the aforesaid bar. At the instant of such release, the lug 38 is caught by the lug 58 and held against anti-clockwise rotation under the influence of the coil spring 37. Just as soon as the cup 48 has rotated to cause the stop lug 53 to wipe against the inclined edge of the lug 60, the bar 56 will again be rotated clockwise to release the lug 38 from the lug 58 on the bar 56. The spring 37 will then immediately rotate the knob 32 and with it the shaft 27 to cut off flow of oil through whichever of the apertures 28, 29 and 30 may have been in registry with the apertures 9 and 31.

It will thus be apparent that when the timing mechanism on the face 33 is properly set, and the knob 32 given the quick clockwise rotation just described, the oil under test will flow through whichever of the apertures 28, 29 and 30 in the shaft 27 as may be registered with the apertures 9 and 31. Since the chamber defined by the upper edge of the partition 25 is at a constant height above the bottom 8, it is obvious that the flow will start in each case under a definite head, and will flow for the same number of seconds for each test. The quantity of oil which flows through a given aperture during this period of time will be an inverse measure of the viscosity of the oil under test. In other words, the thinner or less viscous the oil, the more will flow through the registered apertures during the specified time interval.

It is to be understood, of course, that in starting the operation of this device, the oil to be tested will be drawn up through the tube 4 and in sufficient quantity to fill the chamber C formed by the wall of the casing 1 and the partition 25. Prior to this filling operation, of course, the valve 19 must be closed. After the chamber C has been filled, the excess oil may be discharged from the tube 4 by pressing the bulb in the usual manner. A window 61 mounted in the front wall 33 of the casing 1 serves as a means whereby the operator can determine whether or not the test chamber C has been filled to the upper edge of the partition 25. A suitable air vent 8' is formed in the bottom 8 to permit the escape of air displaced by the flow of oil into the tube 14.

A thermometer 62 is suitably secured to the casing 1 with the bulb thereof located in an oil reservoir 63 in communication with the chamber C. The invention is not concerned with any particular form of temperature indicator so long as it will give an indication of the temperature of the oil within the chamber C and intended to be subjected to a viscosity test. Any suitable form of temperature indicator, such as a thermocouple and connected indicator, may be used instead of a thermometer.

The amount of oil flow during the specified period of test is measured by the rise of oil in the transparent tube 14. A clip 64 is slidably mounted on the tube 14 and is provided with a lining 65 of felt, or other suitable material, which will hold the clip 64 in any position of adjustment on the tube 14, and may be adjusted thereon without scratching the aforesaid tube. A pointer 66 extends from the clip 64 and slides along the periphery of a cylindrical scale member 67 which is provided with as many temperature indicating scales as there are apertures through the shaft 27. The scales on the cylinder 67 are identified at their upper ends by numbers corresponding to the numbers of the recesses 41, 42 and 43 in the slot 40 of the shaft 27. For example, scale number "2" will be positioned against the pointer 66 when the second or intermediate recess 42 is engaged by the spring "click" 46 and the aperture 29 is in position to be registered with the apertures 9 and 31. In the modification shown in Figure 1a, an adjustable clip 64'' is slidably and rotatably mounted on the scale 67, and is provided with a pointer 66' extending toward the tube 14. Obviously, where the tube and scale are closely adjacent to each other the pointer 66' may be omitted.

In this invention in order to reduce the length of tube 14, there are preferably three scales which cover temperatures ranging from 70° F. to 210° F. For example, scale number "1" may be calibrated to indicate temperatures ranging from 70° F. to 110° F.; scale number "2" may be calibrated to indicate a range of temperatures between 110° F. and 170° F.; while scale number "3" may read through a temperature range from 170° F. to 210° F. These particular ranges of temperature are chosen because they cover temperatures commonly found to exist in the crank case oils under test, but these ranges may be extended above or below these temperatures. For example, the scale exposed in Figure 1, covers a temperature range of 170° F. to 270° F.

The quantity of oil which will flow during the time interval through the aperture corresponding to a given temperature scale, is roughly three times as much at the high temperature of the scale as at the low temperature of the same scale although any other proportionate change may be used. By this arrangement, the maximum height of rise of oil in the tube 14 will be practically the same for each of the three temperature ranges covered by the scales as above indicated. The tube 14 is made small in cross section as compared to the cross section of the chamber C so that a small volume change in the flow of oil will be indicated by a relatively large rise of oil in the tube 14, thereby permitting a comparatively large separation of graduations in the temperature scales, and conducing to accuracy in readings. On account of the peculiarity of the temperature-viscosity curve for lubricating oils, the temperature marks on the scales will be farther separated at the lower temperatures of each range. The lower the temperature of the oil, the greater the degree of the separation of the scale indication. The higher the temperature of the oil, the thinner it becomes and therefore the higher it will rise in tube 14 during the timed interval of the valve opening. By setting pointer 66 and consequently clip 64 at heights corresponding to the different temperatures concerned, the change of viscosity with temperature is automatically allowed for and therefore the instrument will give accurate indications of critical viscosity for any temperatures within its range.

This feature makes quick tests possible, since no heating of oil is required.

In cases where only one test aperture and a long tube 14 are used, it is not necessary to employ several scales on 67, but the temperature marks may be etched directly upon tube 14 in a correspondingly long scale.

The diameters of the apertures should be designed so that the tube 14 is nearly filled with oil when the oil flows during the specified period of time at the highest temperature of each range. The diameters of the apertures may be readily determined by very simple experiments. This experimental method of determining the diameters is more practical than attempting to design them from theories involving rates of flow. It is quite possible to employ one fixed aperture through the bottom 8 of the instrument. In that case, however, the tube 14 would have to be made much longer for the same degree of accuracy. The lower the temperature, the larger the aperture necessary for the same quantity of oil to flow through in the given time interval. It is practical, also, to use only two apertures and to increase the length of the tube 14 correspondingly.

It is not essential to have the cylinder 67 rotatable on the tube 4 since the temperature scales may be marked in parallel columns directly on the tube 4. In this case, however, it would still be preferable to use a cylinder similar to cylinder 67 but having a slot extending lengthwise thereof so as to expose only one of the temperature scales at a time. In using the device, the cylinder 67 is turned on the tube 4 until the scale including the temperature indicated by the thermometer 62 is in line with the pointer 66. The clip 64 is moved up or down, as the case may be, until the pointer 66 is opposite the mark on the cylinder scale 67 corresponding to the temperature indicated by the thermometer. Then the oil is permitted to flow into the tube 14 by the operation of the shaft 27 under the control of the timing mechanism as already described.

Rise of oil in the tube 14 above the pointer 66 indicates that the viscosity of the oil under test is too low and should be changed. Rise of oil to any point below the pointer 66 indicates that the oil is in usable condition. Preferably, the clip 64 should be painted red and the words "Change oil" printed thereon. This clip may be extended downward to show "danger" also, or to allow for different standards of viscosity, as for instance— for light, medium or heavy oil, if that is desired.

The scales on cylinder 67 may be calibrated very readily by experimentally determining the positions corresponding to several temperatures for each aperture in the shaft 27, and then marking off the other divisions in accordance with the temperature-viscosity curve for oil which is just too thin to be usable. By calibrating the instrument for oil which is just too thin, a thinner oil will rise above the pointer 66 set to correspond to the particular temperature of the oil under test as indicated by the thermometer 62. By means of this device, then, oil may be drawn from the crank case of an automobile and tested accurately for viscosity at any temperature within the range, for which the instrument is designed, in less than one minute.

No heating of the oil is required and the prospective purchaser can see a graphic demonstration of the condition of the oil in his crank case, since he can actually see the dirty oil in the tube 14 and its rise relative to the danger point as indicated by the clip 64. Any other suitable indicator may be used to indicate the level of the oil in the tube 14, but the device shown is simpler and more graphic as designed, than a device in which, for example, a float geared to a pointer may be used to indicate the oil level in the tube 14.

The instrument can be readily cleaned by drawing gasoline into it and expelling it, but it is not necessary to clean it for every reading. In laboratory tests, the device as shown, clearly indicates differences in viscosity between thin used oils and new oils without any cleaning at all. Oil which is unfit for further use is so much thinner than the thinnest of new viscous oil that there is a wide margin of viscosity which is easily determined and shown by this instrument. The low point of temperature scales on the cylinder 67 should be approximately 1½" to 2" above the lower end of the tube 14, in order that an appreciable column of oil may be visible even for the lowest reading.

In the modification shown in Figure 7, the bottom of the casing 1 has been somewhat modified. In this case, the bottom 102 is made solid rearwardly of the apertures 9 and 31. A square or rectangular opening 103 is formed through the front side of the casing to receive slidably a rectangular block 104. The end 105 of the block 104 is adapted by adjustment of the block to be moved toward and from the wall 106 of the bottom 102. To effect this adjustment, the block 104 is provided with a cylindrical screwthreaded extension 107 which extends through a knob 108 substituted for the knob 32 of the form of the device, shown in Figures 1 and 2.

The timing elements used with this form of the invention are the same as those illustrated in Figures 1 and 2. In this case, since there is a single variable discharge aperture 109 always open, it is necessary to provide a valve for closing this aperture 109 when the knob 108 is in its normal aperture closing position prior to the start of a viscosity testing operation. The knob 108 is provided with a recess 110 in which a torsion spring 111 is located. This spring 111 is wound around the cylindrical extension 107, and has one end secured to the front wall 33 of the casing 1, while the other end is secured to the bottom wall of the recess 110 in the knob 108.

The knob 108 has a flange 112 extending from the lower part thereof and terminating in a shoulder 113 adapted to contact with a stop (not shown) on the front wall 33 of the casing and located in the same relative position as the stop 39, shown in Figure 4 of the drawings. An L-shaped bracket 114 is secured to the bottom 102 and has one arm thereof extending over the flange 112 to secure the knob 108 rotatably against the face 33 of the casing 1.

A nut 115 is screwthreaded onto the cylindrical extension 107 of the block 104 and is provided with a flange 116 in contact with the outer face of the knob 108. A flange 117 upturned on the knob 108 is bent over the flange 116 to maintain the nut 115 against axial movement relative to the knob 108. It will be obvious from inspection of Figure 7, that when the nut 115 is rotated on the knob 108, the end 105 of the block 104 will be moved toward and from the wall 106 of the aperture 109 in order to vary the cross sectional area of said aperture.

The knob 108 is provided with a wedge shape stop 117' similarly placed relative to the shoulder 113 of the flange 112 as is the edge 60' relative to the wedge shape lug 38, shown in Figure 4 of the drawings. So far as the timing operation in this form of the invention is concerned, it is exactly similar to that of the form shown in Figures 1, 2 and 4.

The aperture 31 is closed normally by a valve plug 118 pivotally mounted on one end of a lever arm 119, the other end of which is pivoted to a bracket 120 extending inwardly from the front wall of the chamber C. A laterally offset arm 121 extends from the lever arm 119 intermediate its ends and extends through a slot 122 into the recess 110 of the knob 108. The recess 110 instead of being completely cylindrical as in the form of the invention shown in Figures 1 and 2, is provided with a segmental recess 123 having curved end walls 124 and 125 forming cam surfaces along which the lever arm 121 slides to be raised and lowered by the turning of the knob in either direction. The invention is not particularly concerned with any specific mechanism for operating the lever arm 121. It is immaterial whether the knob 108 have the cam formed to operate on lever arm 121 by a horizontal instead of vertical pressure. This is merely a matter of mechanical skill.

The valve 118 descends by gravity to close the aperture 31 whenever the knob 108 has been rotated sufficiently to permit the lever arm 121 to move from the inner wall of the recess 110 against the wall of the segmental recess. The operation of this form of the invention will be obvious from consideration of Figures 7, 8 and 9. The other elements of the viscosimeter remain unchanged and are identified in Figures 7, 8 and 9 by the same reference numerals as are applied to the same parts in Figures 1, 2, 3 and 4.

The nut 115 is designed to have a temperature scale scored on the periphery of its flange 116 to read against an index mark which may be scored on the periphery of the knob 108. Obviously the adjustment of the scale on nut 115 relative to the mark must be effected when the knob 108 is in its normal position of rest. Obviously, too, the rotation of the nut will move the block 104 axially to vary the cross sectional area of the aperture 109 to correspond with differences in temperature. A rotatable scale member 67 may be mounted on the tube 4, and the transparent tube 14 may be provided with a pointer settable along the tube 14 in the same manner and for the same purpose as that disclosed in connection with the form of the invention illustrated in Figures 1, 2 and 4. Or the pointer and scale 67 may be dispensed with and a fixed scale such as 179 of Figure 16 may be used and all allowances for temperature made by adjusting the size of the aperture.

In the modification shown in Figures 10, 11 and 12, the bottom 126 is deeper than in the previously described forms of the device and is provided with a central discharge aperture 127. The upper part of the discharge aperture is controlled by a valve shaft 128 rotatably mounted in a bore 129 extending transversely of the axis of the aperture 127. The shaft 128 is provided with a knob 130 biased by a torsion spring 131' to a predetermined position in which the valve shaft 128 closes the aperture 127. The periphery of the knob 130 is provided with a flange 131 and wedge shape lug 132 similar in relative position and function to the flange 34 and wedge shape lug 38 of the form of the invention shown in Figure 4. It is preferable to have rectangular block 104 narrow in width so that a relatively great linear displacement will be necessary in order to vary the aperture greatly in area.

This knob 130 and the elements carried thereby cooperate with timing elements similar to the corresponding elements shown in Figure 4. In this form of the invention, the shaft 128 merely acts as a valve and not as a means for varying the rate of flow of liquid from the test chamber C. To vary the rate of flow of liquid from the test chamber C to the indicating tube 14, a plate 133 is mounted to slide in the slot 134 extending through the front face of the casing 1 and communicating with the aperture 127. The plate 133 is provided at its outer end with a screwthreaded cylindrical extension 135 having a scale 136 marked on a flat portion of said member. To adjust this plate, the extension 135 has a nut 137 threaded thereon. This nut has a flange 138 adapted to seat against the front face of the casing and to be held against to and fro movement thereon by means of the upturned arm 139 of a bracket 140 suitably secured to the bottom 126.

This construction facilitates accurate settings of the device; because, for example, divisions of 10° F. may be marked directly on the flat part of the member 135, and the periphery of the knob may be divided to represent intervening degrees in a manner similar to the graduations formed on the common micrometer. A certain correction factor will be necessary in the peripheral readings in this case, because viscosity changes more rapidly with lower temperatures than higher. Several peripheral scales may be used for this purpose.

The device shown in Figures 7 and 10 instead of being provided with the series of scales corresponding to temperature indications in the manner shown in Figure 1 of the drawings, may be provided with a sleeve having a radial extension 150 thereon extending with its outer edge closely adjacent to the periphery of the tube 14. Temperature differences are allowed for by varying the size of aperture. In this case, the sleeve 67 has the aforesaid extension divided into zones having legends spaced apart and reading "Good", "Danger" and "Change". This method of indication is shown more clearly in the modification illustrated in Figure 16.

The modification of the invention illustrated in Figures 13 and 14 is similar to that shown in Figures 10 and 11 so far as the valve operating mechanism is concerned. In this form of the invention, a disk 141 replaces the plate 133. This disk 141 is provided with a series of apertures 142, 143 and 144 corresponding in diameter to the different ranges of temperatures for which the device is adapted to be set. The disk 141 is provided with graduation marks 145, 146 and 147 arranged diametrically opposite the apertures corresponding to the ranges of temperatures hereinbefore described. An indicator 148 is mounted on the front face of the casing to read against these aperture indications in order to facilitate the setting of the disk 141 for variations in temperature. The operation of this form of the device, after the setting of the disk 141, is identical with the form shown in Figures 1 and 2 insofar as the timing and viscosity indication is concerned.

The form of the invention illustrated in Figure 15 is designed to be fixed in position on any suitable support. This form comprises a suitably supported casing 173 having a partition 174 performing the same function as the partition 25 in the form of the invention shown in Figures 1 and 2. The bottom of this casing is provided with an aperture 31' similar to the aperture 31 illustrated in Figure 2, and this aperture 31' is controlled by a rotatable shaft 27 similar in every respect to the shaft shown in Figure 2.

The oil to be tested in this fixed form of the invention, is fed into the top of the casing through a funnel 175 connected at its lower end to a worm 176 which is wound around with a coil 176' of wire adapted to be energized to heat the oil flowing through the worm 176. The worm terminates at its lower end above the top of the chamber C, and conducts the oil to be tested into said chamber. The tube 4, in this form of the invention, merely acts to conduct the overflow from chamber C to a vessel 177 arranged below the instrument. The transparent tube 14 in this case is provided with a clip 64 and a scale similar to that illustrated in Figure 1 of the drawings, although it may be provided with the scale member as 150 of Figures 7 and 10 in which case an adjustable aperture may be used, or the oil may be heated to a definite temperature each time.

In the fixed form, it may be found desirable to have a glass tube 14 rather long so that only one size aperture would be necessary. The lower end of the worm 176 may be equipped with a valve 178 so as to heat the oil to be tested to the same temperature each time in case the device is used with a scale such as 150. Ordinarily, the heating coil surrounding the worm 176 would be used only for very cold oil so as to bring the temperature thereof within the operating temperature ranges of the instrument.

Figure 17:
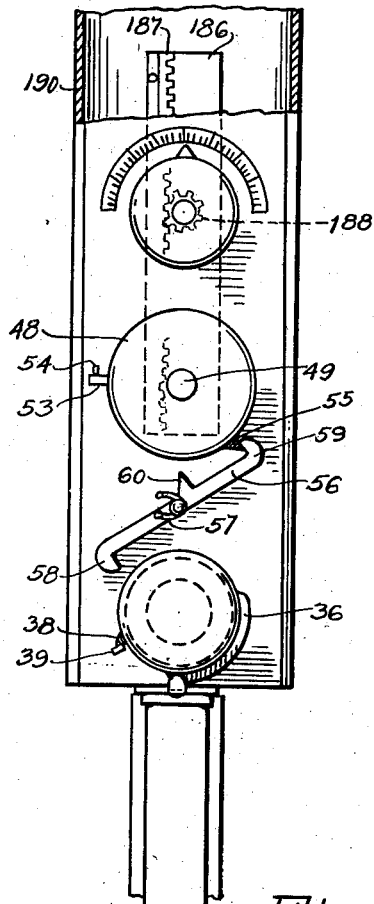
Figure 17 is a front elevation of the modification illustrated in Figure 16.
Figure 18:
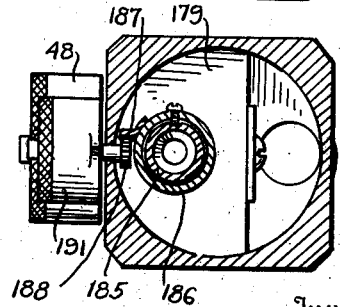
Figure 18 is a horizontal section taken on the line 18—18 of Figure 16.

In the form of the invention illustrated in Figures 16 to 18, inclusive, instead of using different size apertures through the bottom of the container, the same result may be obtained by varying the head of the oil. As shown in Figure 22 of the drawings, the bottom 179 is provided with coaxial apertures 180 and 181, similar to the apertures 9 and 31 of the form of the invention shown in Figures 1 and 2. In this case, the bottom is bored transversely of the axis of the apertures 180 and 181 to receive the rotatable valve plug 182 having an aperture 183 bored diametrically therethrough and adapted, by rotation of the plug, to be moved into and out of registry with the apertures 180 and 181. This valve plug and the knob for operating the same are substantially the same as the valve mechanism illustrated in Figure 14. The knob 184 on the plug 182 cooperates with the usual timing mechanism arranged on the face of the casing 1.

In this modification, the oil containing chamber 185 is preferably made cylindrical and extends up concentrically with the axis of the apertures 180 and 181 from the bottom 179. To vary the head of liquid in this chamber 185, the latter has a sleeve 186 mounted to slide axially thereon with oil-tight fit. This sleeve, as shown in Figure 18, is keyed against rotation about the axis of the chamber 185. A rack 187, suitably secured to the sleeve 186, is engaged by the pinion 188 to raise and lower the sleeve 186 to any height corresponding to the temperature of the oil under test.

The pinion 188 is mounted on the inner end of the shaft 189 extending through the face 190 of the instrument; and the shaft is provided with an operating knob 191 to raise and lower the aforesaid sleeve. Suitable cooperating temperature indication marks are placed upon the knob 191 and the wall 190 of the casing to allow for different ranges of temperature, and a viscosity scale such as the scale 67, shown in Figure 1, may be used with a clip 64 and pointer 66, or a scale may be substituted therefor. The entire adjustment may thus be made by changing the effective head of the oil under test instead of varying the size of the discharge aperture.

The invention is not to be considered as limited to the particular indicating means illustrated in the several figures of the drawings. For example, the clip 64 of Figure 1, may be replaced by a clip 64' slidably mounted on the scale cylinder 67, as shown in Figure 1a of the drawings, and a pointer 66' may be extended from the clip 64' to indicate various critical levels in the tube 14. The pointer 66' may be omitted altogether and the level of liquid in the tube 14 read somewhat approximately relative to the clip 64' which, as stated above, may be adjustably mounted on the scale cylinder 67.

It is thought that the invention and numerous of its attendant advantages will be understood from the foregoing description and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. A testing device comprising: a container having an aperture through one wall thereof, a valve controlling the flow of liquid through said aperture, means for normally urging said valve into aperture closing position, and means operable by movement of said valve from closed to open position for holding the valve open through a fixed period of time.

2. A testing device comprising: a casing, a partition extending across said casing to form a chamber therein, a bottom for said chamber having a discharge aperture therethrough, a valve movable in said bottom to control said aperture, means for normally urging the valve into aperture closing position, a timing device mounted on the casing, mechanism controlled by the timing device and operable by the movement of said valve to open position for holding the valve in open position, and means on the timing device for operating said mechanism to release said valve at the end of a definite time interval.

3. A testing device comprising: a casing, a partition extending across said casing to form a chamber therein, a bottom for said chamber having a discharge aperture therethrough, said bottom being provided with a bore extending through said aperture, a valve rotatable in said bore and slidable axially therethrough to control the flow of liquid through said aperture, said valve being provided with a series of axially spaced apart apertures adapted to be moved selectively into registry with the discharge aperture, yielding means for rotating the valve in one direction in said bore, a stop on the casing for limiting the rotation of the valve in said direction, cooperating stops on the valve and casing for limiting the rotation of the valve in the opposite direction, a timing device mounted on said casing, and mechanism controlled by the timing device and operable by rotation of the valve in said opposite direction to hold the valve in open position, and means on said device and mechanism for releasing the valve at the expiration of a definite time interval.

4. The combination with the device set forth in claim 3, of a transparent tube to receive liquid discharged from the chamber during said definite interval of time, a scale adjacent said tube, and an indicator adjustable on said tube to read on said scale.

5. The combination with the device set forth in claim 3, of a pipe depending therefrom and adapted to conduct liquid therethrough into said chamber, a transparent tube depending from the bottom of said chamber and adapted to receive liquid discharged therefrom, a scale member rotatable on said pipe and having a plurality of scales arranged lengthwise thereon, and a pointer adjustable on said tube to read on any of the scales of the scale member.

6. A testing device comprising: a liquid container, a valve controlling the discharge of liquid from said container, and a timing device settable to control the operation of said valve for definite intervals of time.

7. A viscosity testing device comprising a liquid container having a discharge aperture through a wall thereof, means adjustable on said wall to control the flow of liquid therethrough and to vary the cross sectional area of said aperture, and a timing mechanism cooperating with said means to control the discharge of liquid through said aperture for definite periods of time.

8. A viscosity testing device comprising a liquid container having a discharge aperture through a wall thereof, means for varying the height of the top of said container above said aperture, a valve to control the discharge of liquid through said aperture, yielding means for normally urging said valve into aperture closing position, mechanism settable to hold said valve in discharge position for definite periods of time, and means for indicating the height of said container to correspond with the temperature of liquid under test.

9. A viscosity testing device comprising: a liquid container having a discharge aperture through a wall thereof, means for adjusting the length of said container above said aperture to correspond to changes in temperature of the liquid under test, a valve movable to close or open said aperture, means for normally urging said valve into aperture closing position, and settable timing mechanism operable by moving the valve to open position to hold said valve in open position for a predetermined interval of time.

10. A viscosity testing device for liquids comprising: a container, a chamber in said container, means for conducting liquid through said container into said chamber, a valve adjustable to control the discharge of liquid at various rates from said chamber, and a transparent tube arranged to receive the liquid discharged from said chamber and provided with a scale for indicating the viscosity of the liquid so received.

11. A testing device comprising: a container provided with a discharge aperture, a valve controlling the flow of liquid through said aperture, a timing device settable to control the operation of said valve for definite intervals of time, and a transparent container arranged to receive liquid discharged through said aperture and provided with scales to indicate the viscosity of liquids so received.

ALBERT G. THOMAS.